US006796494B1

(12) United States Patent
Gonzalo (10) Patent No.: US 6,796,494 B1
(45) Date of Patent: Sep. 28, 2004

(54) METHOD AND SYSTEM FOR CONFIGURING A PUBLICLY ACCESSIBLE COMPUTER SYSTEM

(76) Inventor: Steven M. Gonzalo, 2920 E. 15$^{th}$ Rd., Ottawa, IL (US) 61350

( * ) Notice: Subject to any disclaimer, the term of this patent is extended or adjusted under 35 U.S.C. 154(b) by 0 days.

(21) Appl. No.: 09/399,415

(22) Filed: Sep. 20, 1999

Related U.S. Application Data (63) Continuation-in-part of application No. 09/336,355, filed on Jun. 18, 1999, now abandoned.

(51) Int. Cl.$^7$ ................................................. G06K 5/00
(52) U.S. Cl. ...................................... 235/380; 235/492
(58) Field of Search ................................. 710/104, 105, 710/10; 713/2, 1, 100; 235/486, 487, 492, 380

(56) References Cited

U.S. PATENT DOCUMENTS

| | | | |
|---|---|---|---|
| 5,428,785 A | | 6/1995 | Morel et al. |
| 5,491,804 A | | 2/1996 | Heath et al. |
| 5,799,068 A | | 8/1998 | Kikinis et al. |
| 5,815,426 A | | 9/1998 | Jigour et al. |
| 5,835,864 A | | 11/1998 | Diehl et al. |
| 5,862,325 A | * | 1/1999 | Reed et al. ............ 395/200.31 |
| 5,877,975 A | | 3/1999 | Jigour et al. |
| 5,889,941 A | | 3/1999 | Tushie et al. |
| 5,892,902 A | | 4/1999 | Clark |
| 5,982,914 A | * | 11/1999 | Lee et al. ................... 382/124 |
| 5,991,875 A | * | 11/1999 | Paul ............................... 713/2 |
| 6,038,551 A | * | 3/2000 | Barlow et al. ................ 705/41 |
| 6,336,161 B1 | * | 1/2002 | Watts .......................... 711/103 |

OTHER PUBLICATIONS

"Public Net Kiosks Arrive, Companies Begin to Set Up Internet Booths in Airports, Malls, and Even Truck Stops,", Rafter, Michelle V., http://www.internetworld.com/print/1997/06/02/infrastructure/kiosks.html/ [accessed May 31999]. , "Next Up: A Net Kiosk as Small as a Phone Booth," Moran, Susan, http://www.internetworld.com/print/1997/08/04/news/19970804–phone.html/ Aug. 4, 1997.

"Smart Cards," Smart Card Overview, http://developer.netscape.com/tech/security/certs/cards.html/ [accessed May 3, 1999].

"PC/SC Workgroup Releases First Specifications for Integration of Smart Cards with Personal Computers," http://www.smartcardsys.com/doc/CTST1297.html/ Dec. 10, 1997.

"Windows Card from Microsoft—Ovum's Analysis," Brown, Duncan, http://www.ovum.com/news/smc2.html/ [accessed May 17, 1999].

"Customer Configurable Computer," IBM TDB, Serial No. TDB0692.0143, Jun. 1992, http://m.spi.org/cgi–bin/newqry?ISA=Hitl . . . 1992&rec=submit=seeit&csum=18199190403 [accessed May 3, 1999].

* cited by examiner

*Primary Examiner*—Daniel St.Cyr
(74) *Attorney, Agent, or Firm*—Scott J. Fields (57) ABSTRACT

A method and system for initializing and distributing information cards that contain information for configuring a computer system. The information card contains configuration information relating to the configuration of a user's computer. A card generating computer system generates the information cards with user-specific configuration information. The card generating computer system receives a request for an information card from a user of the computer and directs the execution of a transfer program at the user's computer. That transfer program collects configuration information from the user's computer and sends the collected configuration information back to the card generating computer system. The card generating computer system then stores the received configuration information on the information card. The information card is then sent to the user. The user can use the information card at a publicly accessible computer system to configure that computer system in a similar way to which the user's computer system is configured.

5 Claims, 6 Drawing Sheets

METHOD AND SYSTEM FOR CONFIGURING A PUBLICLY ACCESSIBLE COMPUTER SYSTEM

CROSS-REFERENCE TO RELATED APPLICATION

This application is a Continuation-in-Part of U.S. Pat. application Ser. No. 09/336,355 filed Jun. 18, 1999 now abandoned.

TECHNICAL FIELD

The present technology relates to configuring a component of a computer system and, more particularly, to the storing of configuration information on an information card that is then used to configure a component of a publicly accessible computer system.

BACKGROUND

Computer users are becoming increasingly more dependent on access to the World Wide Web in conducting their personal and business affairs. This dependence is so great that these computer users find it imperative to take a laptop computer whenever they travel. With these laptop computers, the users can access the World Wide Web and their electronic mail so that they can effectively conduct their affairs. There are, however, difficulties with the use of such laptop computers. First, such laptop computers can be very expensive. Indeed, such laptop computers are much more expensive than a corresponding desktop computer with similar computing and storage resources. Second, although the laptop computers are portable, they can be very cumbersome to transport and use. For example, a user staying at a hotel may need to reconfigure a web browser to use new access telephone numbers and new access codes for the telephone system of a hotel. Such reconfiguration can be difficult for all but the most experienced computer user. Third, companies often provide laptop computers to their employees who are traveling. These laptop computers, however, are configured generically. An employee who uses such a generically configured laptop will find the laptop computer much more difficult to use than their desktop computer. For example, a user may have defined various bookmarks or a home page for their web browser on their desktop computer. The generically configured laptop computers, of course, would not have such bookmarks or home page defined. Fourth, a user may need access to the World Wide Web when the user may not have their laptop computer with them. For example, the user's bank may provide a web site through which the user can review interest rates and principal and interest payments for auto loans, can review credit qualifications, and can submit a loan application. A user who is negotiating an auto purchase may be at a disadvantage if the user cannot access such a web site during the negotiations.

The configuration information that a user may become dependent on may include the addresses of incoming and outgoing electronic mail servers, the addresses of new services, the address book of an electronic mail system, bookmarks of a web browser, the home page of a web browser, the telephone numbers of an Internet service provider, various "cookies" that have been stored on the user's computer by a web server, and so on. It would be very time-consuming and cumbersome if a user was to manually record such configuration information and then manually reconfigure a laptop computer. It would be desirable to have technique which would allow users access to a computer system that is configured the same way as their desktop computer system is configured.

SUMMARY

A method and system for initializing and distributing information cards that contain information for configuring a computer system are provided. In one embodiment, the information card contains configuration information relating to the configuration of a user's computer. A card generating computer system generates the information cards with user-specific configuration information. The card generating computer system receives a request for an information card from a user of the computer and directs the execution of a transfer program at the user's computer. That transfer program collects configuration information from the user's computer and sends the collected configuration information back to the card generating computer system. The card generating computer system then stores the received configuration information on the information card. The information card is then sent to the user. The user can use the information card at a publicly accessible computer system to configure that computer system in a similar way to which the user's computer system is configured. Alternatively, a user may generate such an information card if their computer has a device for storing information on the information card.

The publicly accessible computer may include an Internet connection, a information card reader, and a configuration manager. When the information card is provided to the publicly accessible computer system, the configuration manager reads the configuration information from the card. It then configures the various components in accordance with the configuration information. These components may include a web browser, an electronic mail system, and so on. The configuration information may include, for example, the home page of the web browser, bookmarks of the web browser, the electronic mail server address for the electronic mail system, electronic mail address book, or an IP address through which voice mail is accessible.

DETAILED DESCRIPTION

A method and system for configuring a computer system in accordance with configuration information derived from a user's personal computer system are provided. The configuration system in one embodiment provides for the collection of configuration information from a user's computer via a web server. Once the web server collects the configuration information, it stores the configuration information on a transportable information card (e.g., a credit card, a smart card, or an EPROM device). The transportable information card is then provided to the user. For example, the information card may be a mailed to the user or hand-delivered to the user if the information card is generated by a company that employs the user. The user can then take the information card with their personalized configuration information stored to a publicly accessible computer system (e.g., at a kiosk in an airport) or any other computer system that is accessible to the user. If the computer system includes a card reader for the information card, then the user can insert the information card into the card reader to have the computer system automatically configured based on the configuration information stored on information card. Once the computer system is configured, the user can then access the various components (e.g., web browser and electronic mail system) of the computer system. The computer system may record information describing the user's access so that the user's account or credit card may be debited. When the user finishes using the computer system, the computer system preferably reinitializes its configuration so that personal information of that user is not available to a subsequent user of the computer system.

Figure 1:
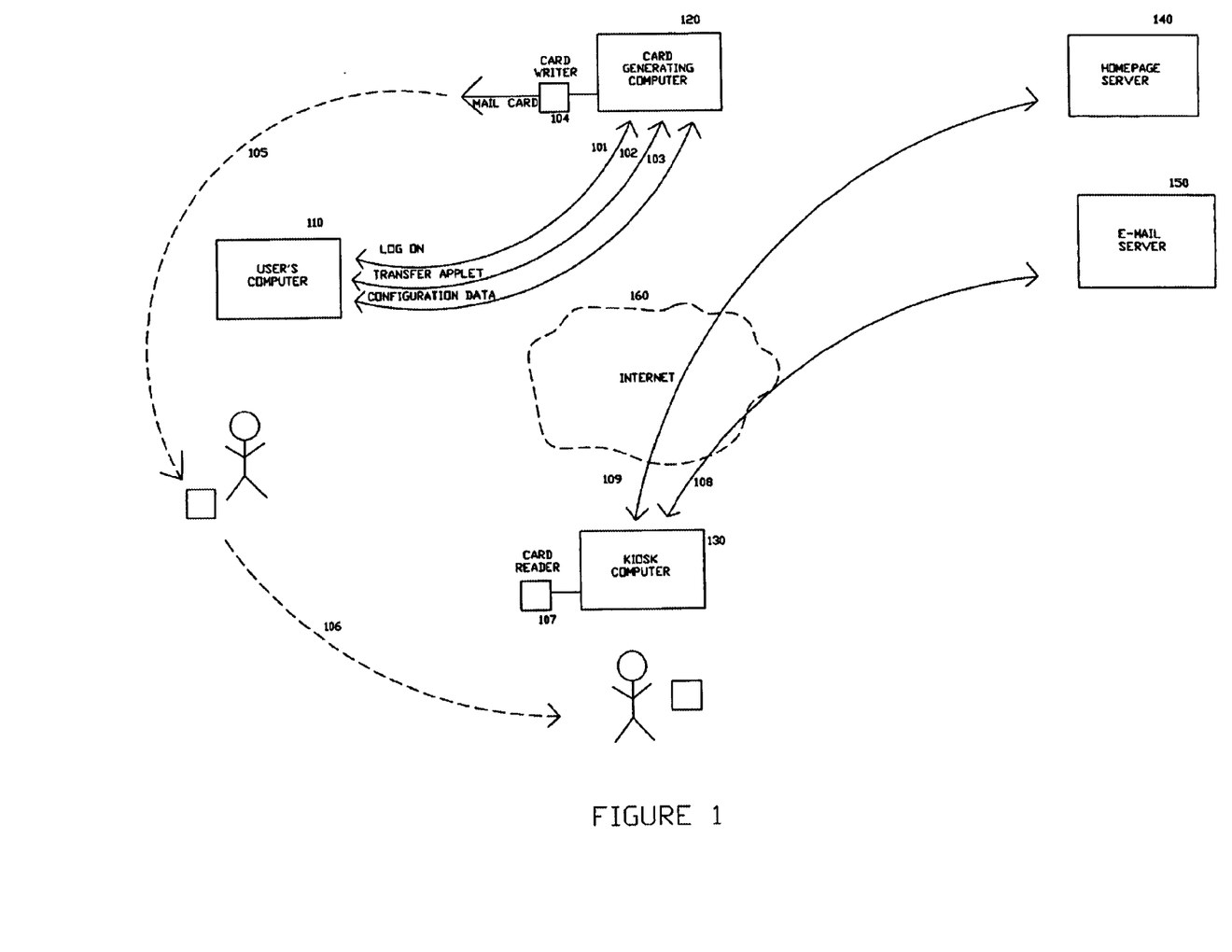
FIG. 1 is a block diagram illustrating the components of and processing of the configuration system in one embodiment.

FIG. 1 is a block diagram illustrating the components of and processing of the configuration system in one embodiment. In this example, a user's computer 110, a card generating computer 120, and a kiosk computer 130 interact to provide the user with easy access to the home page server 140 and electronic mail server 150 of the user. These computers in one embodiment are interconnected via the Internet 160. In order to use an information card, the user initially requests the card generating computer to generate an information card. To do so, the user logs on to the card generating computer using a web page provided by the card generating computer. When the user's log on is verified, the card generating computer sends 102 a transfer application to the user's computer. That transfer application retrieves the configuration information from the user's computer and transfers 103 the retrieved configuration information to the card generating computer. The configuration information may include indications of a preferred web browser (e.g., it Microsoft's Internet Explorer or Netscape's Navigator), a home web page, book marks or favorite web pages, an electronic mail server address, electronic mail addresses from an address book, an IP address from where voice mail can be retrieved, and so on. The card generating computer then stores 104 the configuration information on the information card. The card generating computer may also store additional information on the information card. The card generating computer may store a dollar credit that can be debited when the user makes a purchase using the information card. For example, the user may purchase an item (e.g., a book) via the World Wide Web, and the seller can effect electronic payment by debiting the dollar amount. The card generating computer may also store credit card information, user name and address information, and delivery address which may be needed to conduct a commercial transaction via the World Wide Web. In one embodiment, the card generating computer system may store an indication of a start up web page on the information card. For example, information cards that are generated for customers of a bank may have the main web page of the bank stored as the start up web page. This start up web page may override the home web page setting of the configuration information. That information card is then sent 105 to the user. The card generating computer may be operated by or on behalf of a service organization (e.g., a bank) that provides the information cards to encourage users to use its services. The user may then travel 106 with the information card to a kiosk computer (e.g., a publicly accessible computer). At the kiosk computer, the user provides 107 the information card to the card reader. The kiosk computer then configures its various components in accordance with the configuration information retrieved from the information card. The user can then access 108 the electronic mail server or access 109 the home page server based on the configuration information retrieved from the information card. In an alternate embodiment, if the user's computer has a card writer, the generating of the card could be performed at the user's computer.

Figure 2:
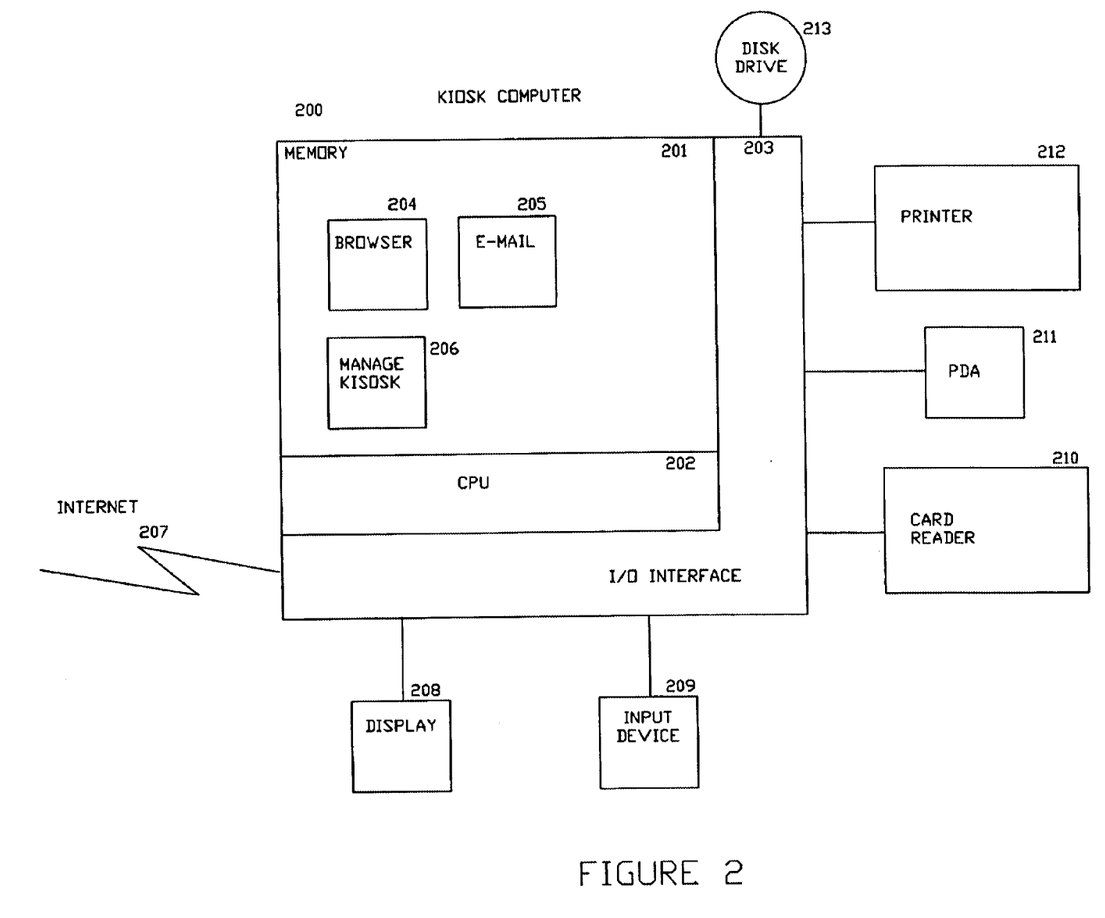
FIG. 2 is a block diagram illustrating the components of a kiosk computer.

FIG. 2 is a block diagram illustrating the components of a kiosk computer. The kiosk computer 200 includes a memory 201, a central processing unit 202, and an input/output interface 203. The memory may include configurable components such as a browser 204 (or multiple browsers), an electronic mail system 205 and a manage kiosk component 206. The manage kiosk component is responsible for reading configuration information and configuring the components of the kiosk computer accordingly. The kiosk computer also includes an Internet connection 207, a display 208, an input device 209, a card reader 210, a personal digital assistant ("PDA") interface 211, a printer 212, and a disk drive 213. The input device may include a keyboard and a pointing device, such as a trackball. The card reader may be any device that is capable of reading the information that is stored on an information card. The personal digital assistant interface allows information to be transferred to and retrieved from a user's PDA device. The printer may be used to print out electronic mail or other information. The disk drive may contain the operating system, the browser, the electronic mail system, and the manage kiosk component. When a user provides the information card to the card reader (e.g., inserts the information card into the card reader), the manage kiosk component configures the kiosk computer and allows the user to access the various configured components. In addition, the kiosk computer may display advertising information when not being used by a user or even while the user is using the computer. This advertising information may be downloaded from the web. The display of advertising information may be tailored to the environment in which the kiosk computer is located. For example, if the kiosk computers are located in a hotel lobby, then the advertising information may relate to that hotel. The computer instructions implementing the aspects of the configuration system and related data structures can be stored on a computer-readable medium such as a memory device, CD-ROM, or disk, or transmitted over a computer-readable transmission medium, such as an optical fiber.

Figure 3:
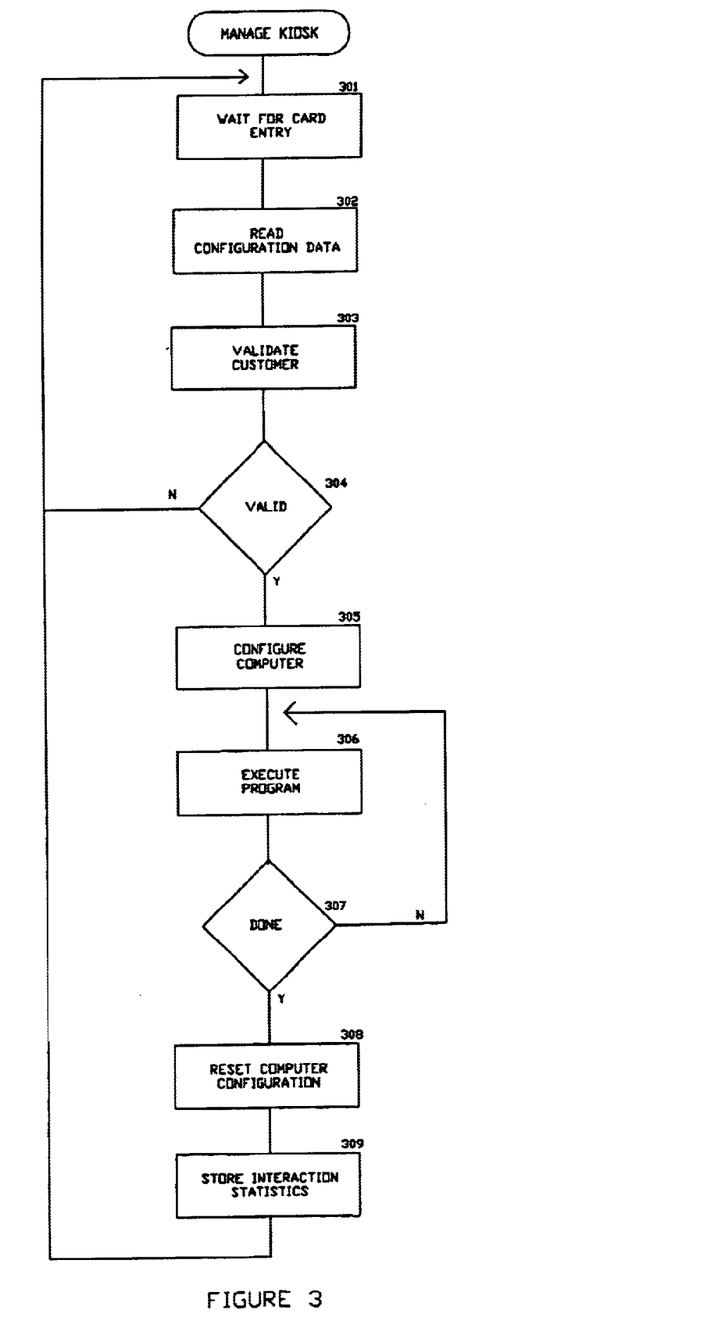
FIG. 3 is a flow diagram illustrating an example implementation of the manage kiosk component.

FIG. 3 is a flow diagram illustrating an example implementation of the manage kiosk component. The manage kiosk component controls the reading of information from an information card, the configuring of components, and the accessing of the configured components by the user. In step 301, the managed kiosk component waits for entry of an information card into the card reader. In step 302, when the manage kiosk component detects that an information card has been entered, it reads the configuration information from the information card. In step 303, the manage kiosk component may is validate the information on the information card to ensure that the user is authorized to access this kiosk computer. The authorization may be based solely on information stored on the information card or may be based on information retrieved from the central server via the Internet. In step 304, if the user has been authorized, then the manage kiosk component continues at step 305, else the manage kiosk component may display a message and loop to step 301 to wait for entry of another information card. In step 305, the manage kiosk component configures the components of the kiosk computer in accordance with the retrieved configuration information. For example, the manage kiosk component may define various bookmarks and a home page for the browser and specify the address of a server for the electronic mail system. In step 306–307, the manage kiosk component allows the user to execute various programs that it provides. For example, the user may interact with a browser to access the World Wide Web or an electronic mail program. When the user has finished using the kiosk computer, the manage kiosk component resets computer configuration information in step 308. This resetting ensures that a subsequent user of the kiosk computer will not have access to confidential information from a previous user. The manage kiosk component then stores statistics relating to the user's interaction so that, for example, the user can be billed for the access. The manage kiosk component then loops to step 301 to wait for entry of another information card. The manage kiosk component may also provide a filtering mechanism for certain applications that transmit and receive data via the Internet. The filtering mechanism may limit the size of files that are transmitted and received by the kiosk computer. By limiting the size of such files, the time that each user spends using a kiosk computer is reduced which allows more users to use that kiosk computer. The filtering mechanism that is incorporated into a browser may determine the size of graphics files that are part of a web page. If a graphics file is too large, the filtering mechanism can suppress the downloading of the graphics file. The filtering mechanism may display a message on the web page indicating that the graphic is not being displayed. If the filtering mechanism is incorporated into an electronic mail system, then it may prevent the transmitting and receiving of attachments that are too large. One skilled in the art will appreciate that the setting of a threshold file size may vary based on storage capacity of the kiosk computer and speed of the Internet connection.

Figure 4:
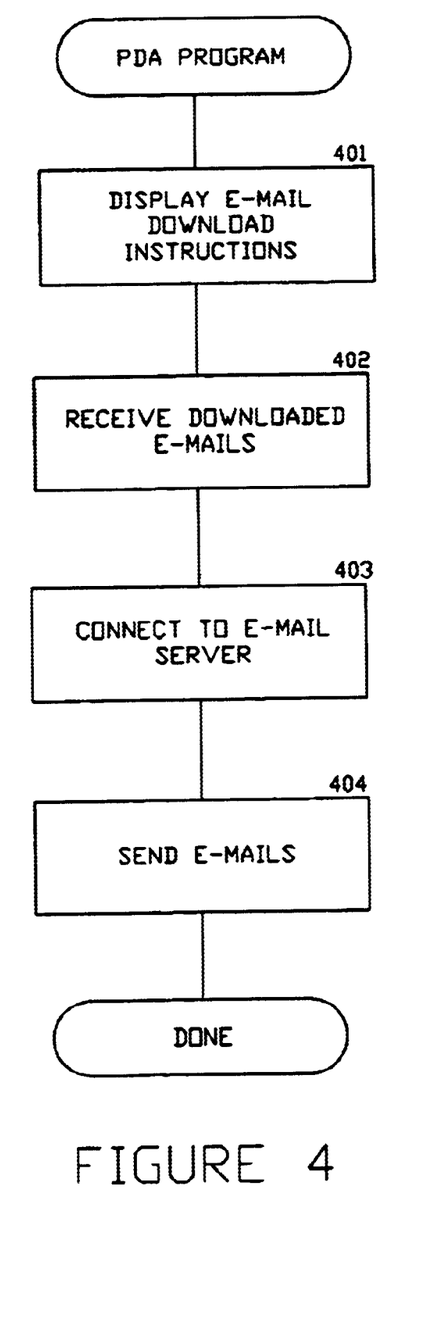
FIG. 4 is a flow diagram illustrating a example program for coordinating the interface between the kiosk computer and a PDA.

FIG. 4 is a flow diagram illustrating a example program for coordinating the interface between the kiosk computer and a PDA. In this example, the PDA program allows the user to send electronic mail from the PDA. In step 401, the PDA program displays instructions for transferring electronic mail. In step 402, the PDA program receives the electronic mail that is to be transferred from the PDA to the kiosk computer. In step 403, the PDA program connects to the electronic mail server specified on the information card provided by the user. In step 404, the PDA program transmits the retrieved electronic mail to the electronic mail server. The PDA program may also retrieved electronic mail from the electronic mail server and transmit that retrieved electronic mail to the PDA.

Figure 5:
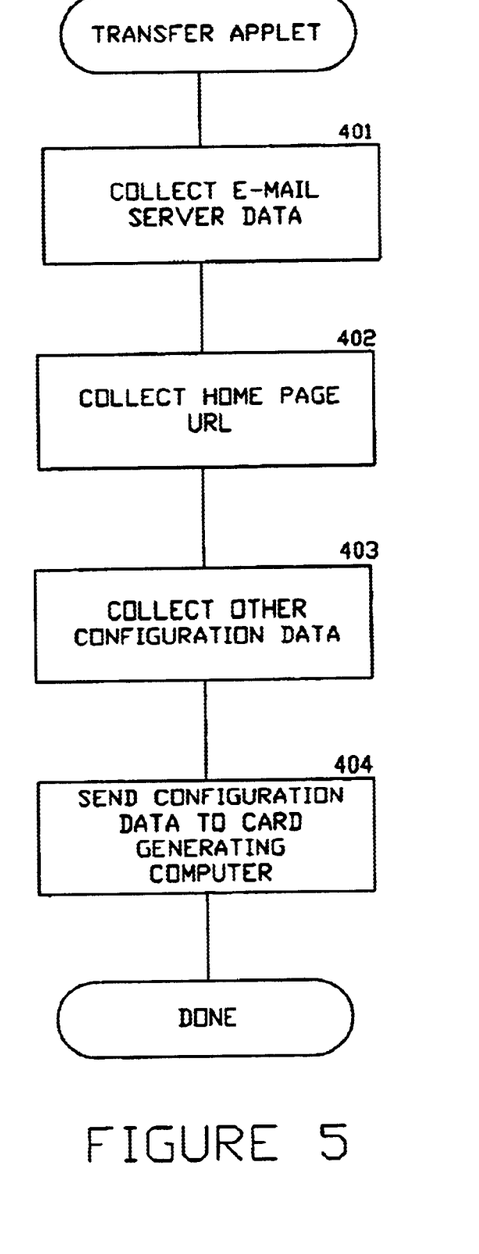
FIG. 5 is a flow diagram illustrating an example implementation of an example transfer application that collects and transfers configuration information.

FIG. 5 is a flow diagram illustrating an example implementation of an example transfer application that collects and transfers configuration information. The transfer application may be transferred from a card generating computer to a user computer via the Internet or may be loaded onto a user computer from a disk. The transfer application may be initiated by the user or by instructions sent from the card generating computer. In step 501, the transfer application collects electronic mail server configuration information (e.g., address of the electronic mail server). In step 502, the transfer application collects the home page URL browser. In step 503, the transfer application collects various other configuration information. The configuration information that is collected may be predefined by the configuration system or the configuration system may allow the user to specify which configuration information is to be transferred. One skilled in the art will appreciate that many different types of configuration information may be collected and stored in the information card. For example, if the kiosk computer provides word processing capabilities, then the configuration information may include the user's word processing preferences. In step 504, the transfer application sends the configuration information to the card generating computer and completes.

Figure 6:
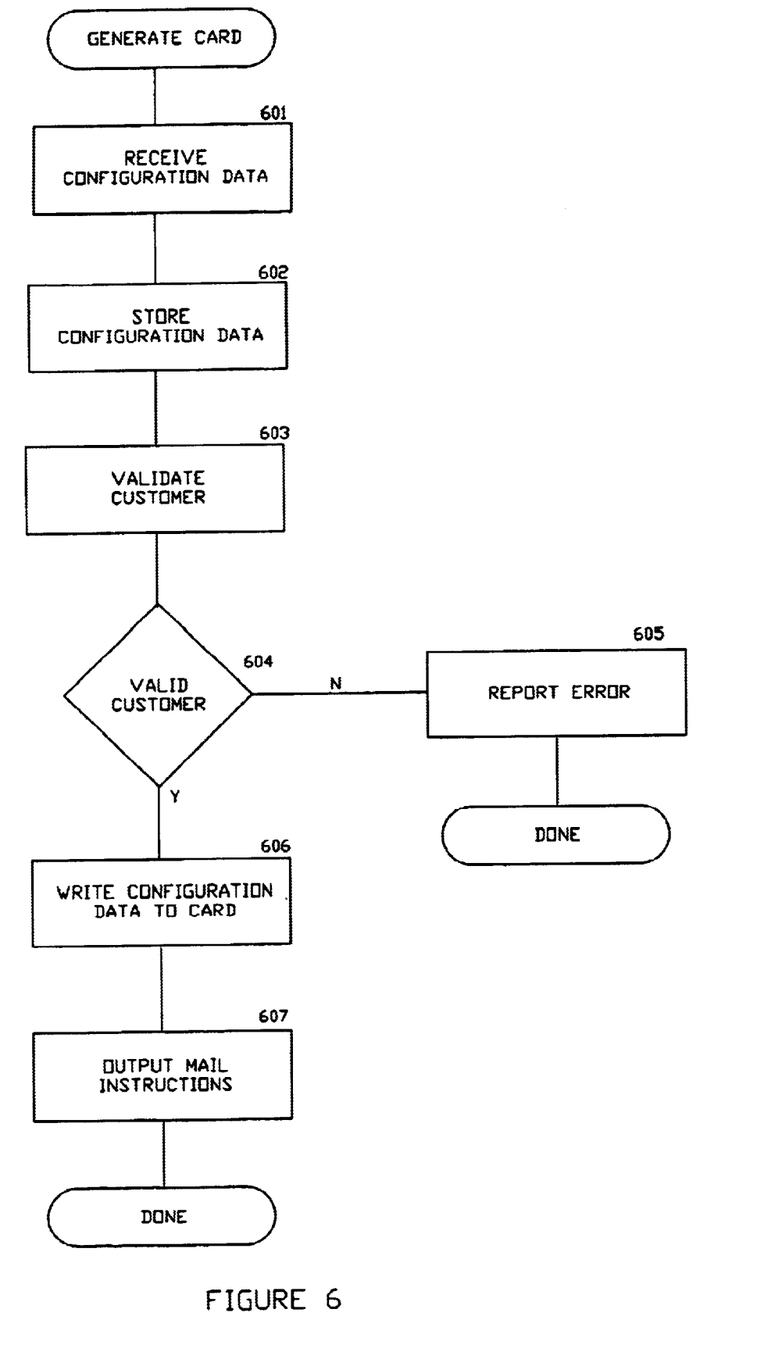
FIG. 6 is a flow diagram illustrating an example implementation of a generate card component of the card generating computer system.

FIG. 6 is a flow diagram illustrating an example implementation of a generate card component of-the card generating computer system. In step 601, the generate card component receives configuration information from a user computer system. In step 602, the generate card component optionally stores the configuration information in a user configuration database. In step 603, the generate card component determines whether the user is an authorized user. In step 604, if the user is authorized, then the generate card component continues at step 606, else the generate card component reports an error in step 605 and completes. In step 606, the generate card component writes the configuration information to information card. In step 607, the generate card component outputs mail instructions (e.g., a address of the user) so that the information card can be delivered to the user. The generate card component that completes.

Although specific embodiment of the invention have been described for purposes of illustration, various modifications may be made without deviate from the spirit and scope of the invention. For example, access to a kiosk computer can be restricted, such as being located in an employee-only area of a hotel rather than being located in a publicly accessible area. When a user checks into the hotel, the hotel employee can use the information card to "register" the user at that location. During the stay at the hotel, the user's electronic mail can be sent to the hotel's computer for printout and delivery to the user or for display on the television in the user's hotel room. When the user checks out, the user's information is then removed from the hotel's computer. Also, the kiosk computer can be used to access a user's voice mail that is accessible via the World Wide Web. A voice mail system may store the voice mail on a storage device that is accessible to a web server. The web server may provide a user interface through which a user can view a list of voice mail and select to listen to a voice mail. The kiosk computer may include a headset for outputting the voice mail. Alternatively, the voice mail may be recognized using a voice recognition component and the text of the recognition may be accessible from the web server.

In one embodiment, configuration information may be stored on a central server rather than on the information card. The information card may contain the identification of the user, such as a credit card number. When the user inserts the information card into the kiosk computer, the computer reads the user's identification from the card and then sends a request to the central server for configuration information of the identified user. When the requested configuration information is received, the kiosk computer updates its configuration as appropriate. The use of a pre-existing information card, such as credit cards, allows users to take advantage of the kiosk computers without having to be issued new information cards. The configuration information at the central server for a user can be organized based on the user's identification, such as a debit card or credit card number, bank account number, employee number, name, driver's license number, social security number, and so on.

However, as new information cards are generated, for example as a result of expiration of old information cards, the new information cards may contain configuration information.

What is claimed is:

1. A method in an information card generating computer system for initializing and distributing information cards that contain configuration information for configuring a computer of a user, the method comprising:

receiving a request for an information card from a user of a user computer;

directing execution of a program on the user computer that collects configuration information from the user computer and sends the collected configuration information to the information card generating computer system;

storing the configuration information on an information card; and directing the distribution of the information card to the user so that the user can use the information card to configure a computer that is capable of reading the information card.

2. The method of claim 1 wherein the configuration information relates to the configuration of a web browser.

3. The method of claim 1 wherein the configuration information relates to access of electronic mail.

4. The method of claim 1 including transferring the program that collects the configuration information from the information card generating computer system to the user computer.

5. The method of claim 1 including storing information at the information card generating computer system indicating that an information card was generated for the user.

* * * * *